United States Patent [19]
Montgomery et al.

[11] Patent Number: 6,043,924
[45] Date of Patent: Mar. 28, 2000

[54] CONSTANT POWER DENSITY ACOUSTIC TRAVELING WAVE LENS

[75] Inventors: Robert M. Montgomery; Reeder N. Ward, both of Indialantic; Mark T. Montgomery, Melbourne Beach; Pat O. Bentley, West Melbourne, all of Fla.

[73] Assignee: Harris Corporation, Melbourne, Fla.

[21] Appl. No.: 09/235,696

[22] Filed: Jan. 22, 1999

[51] Int. Cl.[7] .................................................. G02F 1/33
[52] U.S. Cl. ...................... 359/285; 359/313; 359/305; 385/7
[58] Field of Search ................. 385/7; 359/285, 359/305, 313

[56] References Cited

U.S. PATENT DOCUMENTS

| | | | |
|---|---|---|---|
| 3,676,592 | 7/1972 | Foster | 178/7.6 |
| 5,801,874 | 9/1998 | Montgomery et al. | 359/305 |

*Primary Examiner*—Georgia Epps
*Assistant Examiner*—Adrianne Riviere
*Attorney, Agent, or Firm*—Charles E. WAnds

[57] ABSTRACT

An acoustic traveling wave lens structure for an acousto-optic scanner comprises a confined height fluid-containing channel, upon which a scanned optical beam to be modulated by a acoustic traveling wave is incident. The channel is bounded by spaced-apart walls that extend between a first end of the scanner channel, to which an acoustic transducer is coupled, and a second end of the channel that terminates an acoustic traveling wave launched from the acoustic transducer. The thickness of the channel is linearly tapered from the first end to the second end, so as to maintain a constant acoustic power density. To compensate for the attenuation in acoustic power through the water medium, the waveguide may be heated, to maintain the temperature of the liquid medium (water) within the waveguide channel within a prescribed temperature range over which the acoustic velocity remains substantially constant or undergoes a relatively small variation.

19 Claims, 2 Drawing Sheets

OPENING FOR TRANSDUCER 34
5cm SCAN LENGTH
30
32
36
W
1mm GUIDE HEIGHT h
LIGHT BEAM

XDUCER
40
45
43
41
47
X

ACOUSTIC VELOCITY

68° 74° 78°
TEMP °C

CONSTANT POWER DENSITY ACOUSTIC TRAVELING WAVE LENS

FIELD OF THE INVENTION

The present invention relates in general to laser scanning systems, and is particularly directed to a tapered acoustic traveling wave lens structure for a wide aperture, high resolution scanner, and is operative to maintain a constant acoustic power density of the acoustic wave over the length of the waveguide. In addition, to compensate for attenuation in acoustic power through the water medium, the waveguide may be heated, to maintain the temperature of the water within the waveguide channel within a prescribed temperature range over which the acoustic velocity remains substantially constant or undergoes a relatively small variation.

BACKGROUND OF THE INVENTION

FIG. 1 diagrammatically illustrates a typical configuration of a guided acoustic travelling wave lens device—one that employs a relatively narrowly dimensioned traveling wave channel—as comprising a laser 10, the optical beam output 11 of which is focussed by a cylindrical lens arrangement 12 and deflected by a mirror 13 onto an acousto-optic beam deflector 14, to which an RF input signal is applied. The acousto-optically modulated beam is then re-imaged by a further spherical-cylindrical lens arrangement 15 onto a traveling lens cell 16, than contains a traveling wave lens transport medium 17 and a traveling wave lens launching transducer 18. The scanned beam is then imaged onto an image collection medium, such as a photographic film 19.

For a non-limiting illustration of examples of documentation describing such guided acoustic traveling wave lens; devices, attention may be directed to an article entitled: "Optical Beam Deflection Using Acoustic-Traveling-Wave Technology," by R. H. Johnson et al, presented at the SPIE Symposium On Optical, Electro-Optical, Laser and Photographic Technology, August 1976, FIG. 6 of which corresponds to FIG. 1, above, an article entitled: "Guided acoustic traveling wave lens for high-speed optical scanners," by S. K. Yao et al, Applied Optics, Vol. 18, pp 446–453, Feb. 1979, and the U.S. Pat. No. 3,676,592 to Foster.

In such guided wave devices the properties of the fluid will affect the characteristics of the acoustic wave lens traveling through it. In particular, since fluid velocity and friction force are functions of distance from the transducer, the acoustic power P and frictional power loss Pf are also functions of distance. Due to the viscous properties of liquid, particularly in the vicinity of its interface with the boundaries of the channel, external forces iLmparted by the electro-acoustic transducer do not maintain a constant acoustic power density of the acoustic wave over the length of the cell. For a rectangular waveguide having a constant narrow cross-section of width w and height h (where h<<w), it has been demonstrated that acoustic power density will undesirably undergo an exponential attenuation along the length x of the waveguide.

SUMMARY OF THE INVENTION

In accordance with the present invention, this unwanted acoustic power attenuation problem is successfully obviated by gradually reducing the cross-sectional area of the acoustic wave transmission channel over its length, in particular, by (linearly) tapering the height of the channel along its length, from the transducer end to the far end of the waveguide. As will be described, the slope of the taper is equal to $\alpha_0$, which is the same as the attenuation factor for a narrow rectangular guide of constant height $h_0$. Both the average acoustic power per cross-sectional area (acoustic intensity) I and guide height h are functions of distance x. For the case of a taper $k \cong \alpha_0$, the attenuation becomes negligible compared to the concentrating effect of the channel taper and $I \cong I_0/(1-kx)$.

In a test application, a guided liquid ATWL employing water as the acoustic medium was driven at an acoustic frequency 500 kHz, yielding an effective quarter wavelength aperture of 0.75 mm. The guide height thickness was 1 mm, making the dimension between a quarter and a half wavelength. The e acoustic attenuation was measured at approximately 4 dB over the 50 cm scan length. The theoretical attenuation coefficient $\alpha_0$ for a 1 mm waveguide is $(2)\upsilon\omega^{1/2}/ch$ or $0.0167$ cm$^{-1}$, where $\upsilon=10^{-6}$ m$^2$/s, $\omega=2\Pi$ $5\times10^5$/s, $c=1500$ m/s, and $h=1$ mm. Using this value, the theoretical attenuation over 50 cm is 3.6 dB.

Tapering this test waveguide geometry with a slope equal to $\alpha_0$ yields a height of $1-(0.0167)(50)$ or 0.16 mm at the end of the 50 cm guide. To maintain the desired height range, an initial 1 mm waveguide is too small for a 50 cm waveguide. Increasing the initial guide height to 1.4 mm yields $\alpha^0=0.0119$ cm$^{-1}$, and a (relatively practical) height of 0.80 mm at a distance of 50 cm from the acoustic transducer. Moreover, reducing the acoustic frequency allows longer channel lengths, since lowering acoustic frequency decreases the attenuation factor, and also allows for larger guide heights due to the longer acoustic wavelength.

A constant acoustic velocity within the aperture of the ATWL is critical for precision scanning systems.

Acoustic velocity is a function of temperature, such that non-uniform temperature in the acousto-optic medium will distort the velocity and decrease the scan linearity of the device.

As a further feature, to minimize the effect of temperature non-uniformity through the water medium, the waveguide may be heated, to maintain the temperature of the liquid medium (water) within the waveguide channel within a prescrhbed temperature range over which the change in acoustic velocity remains with temperature is at a local minimum.

DETAILED DESCRIPTION

Figure 1:
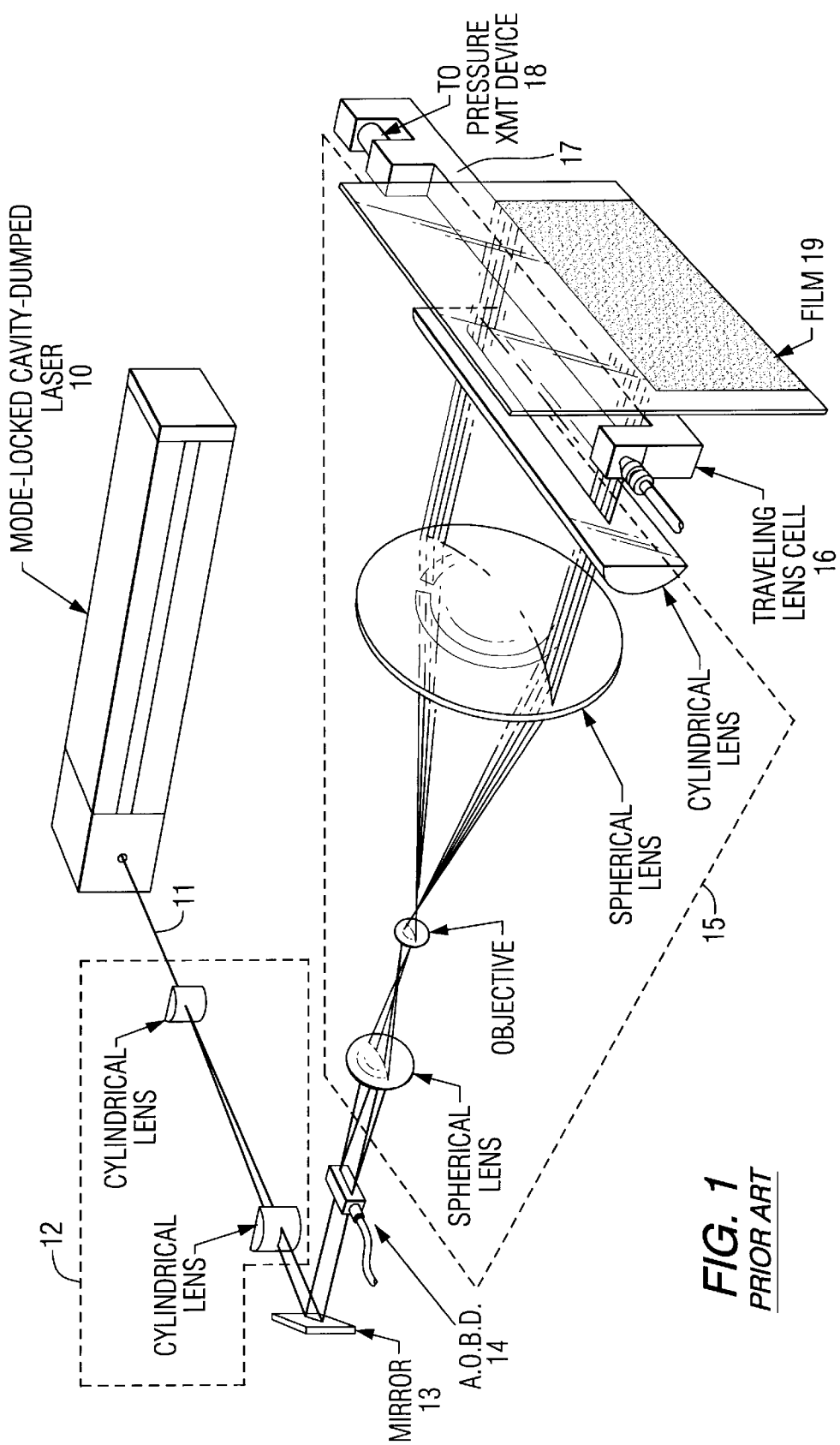
FIG. 1 diagrammatically illustrates the architecture of a guided acoustic travelling wave lens device.

As discussed briefly above, in a conventional rectangular waveguide of constant narrow cross-section (i.e., having a fixed width w and height h (where h<<w)), the acoustic power density will undergo an exponential attenuation along the length x of the waveguide. In order to appreciate this condition and the attenuation compensation effect that is achieved by the channel tapering of the invention, the effect of viscous attenuation in the channel will be preliminarily addressed.

As described in the text by H. Lamb, entitled "Hydrodynamics", Sixth Edition, Dover Publications, New York, 1932, 738 pp., for a body of fluid extending over a distance from y+0 to y′, and bounded at y=0 by a rigid planar surface (e.g., plate) oscillating only in x, as u=cos(ωt), a solution for the particle velocity (u) in the fluid may be defined in the below equation (1) as:

$$u = ae^{-\beta y}\cos(\omega t - \beta y) \quad (1)$$

where: a is peak amplitude of the particle velocity at the plate, and

β is a constant equal to $(\omega/2\upsilon)^{1/2}$.

In this derivation, it is assumed that the fluid is incompressible and the fluid flow is laminar. It is also presumed that an external force is applied to the plate, so as to maintain "a" constant. This force must oppose the retarding force on the plate due to fluid friction. As further described in the Lamb article, the friction force per unit area acting on the boundary is set forth in equation (2) below as:

$$f = -\mu\left[\frac{du}{dy}\right]_{y=0} = -\rho\sqrt{v\omega}\, a\cos(\omega t + \pi/4) \quad (2)$$

To evaluate attenuation of the traveling acoustic wave, it is useful to know the power that is dissipated as a result of the friction force f. The total friction force $F_f$ acting on an area of the boundary $A_p$ is equal to $F^*A_p$. The average power dissipated by the friction force on area $A_p$ may be calculated by integrating the product of $F_f$ and the velocity at the boundary over a period of oscillation, realizing equation (3) as:

$$PSUBf =$$

$$\frac{1}{T}\int_o^T F_f * u\, dt = a\rho\sqrt{v\omega}\, A_p \int_o^{T_0}\cos(\omega t+\pi/4)*\cos(\omega t)dt = \frac{a^2\rho}{2}$$

Although equations (1)–(3) are derived for the case of a fluid bounded on one side, they also hold true for guided fluid flow within a very narrow channel, where cross-sectional dimensions are large compared to the value of $\beta^{-1}$. In addition, although this derivation is based on an oscillating boundary in contact with the fluid, it also holds true for a stationary boundary in contact with an oscillating fluid.

In a fluid acoustic waveguide, a piezoelectric transducer provides an external force to maintain average acoustic power constant with time at a given location along the waveaguide. However, the external force will not maintain constant acoustic power over distance. As a consequence, the fluid velocity and friction force will be functions of distance x, or equivalently, the acoustic power P and the frictional power loss $P_f$ will be functions of x.

Over a small section of a waveguide of thickness Δx, the change in the acoustic power must equal the power loss. Therefore, $\Delta P = P(x+\Delta x) - P(x) = P_f(x)$. Letting $A_p = L^*\Delta x$, where L is the length of the perimeter of the guide; from equation (3), ΔP may be defined as set forth below in equation (4) as:

$$\Delta P = -\frac{a^2\rho}{2}\sqrt{\frac{v\omega}{2}}\, L\Delta x \quad (4)$$

or, in differential form dP/dx, as equation (5):

$$dP/dx = -\frac{a^2\rho}{2}\sqrt{\frac{v\omega}{2}}\, L \quad (5)$$

Using the relationships $I=\frac{1}{2}\rho ca^2$ and $I=P/A_c$, both sides of equation (5) can be related to I—the average acoustic power per cross-sectional area or acoustic intensity, associated with the general condition for the variation of acoustic power intensity along the length of a guide—which may be defined in equation (6) as:

$$\frac{d(I*A_c)}{dx} = -\frac{L}{C}\sqrt{\frac{v\omega}{2}}\, I \quad (6)$$

For a cylindrical waveguide of constant radius r, $A_c=\Pi r^2$ and L=2Π, so that equation (6) reduces to equation (7) as:

$$\frac{dI}{dx} = -\frac{\sqrt{2v\omega}}{cr}I = -\alpha I \quad (7)$$

The solution of equation (7) is:

$$I = I_0 e^{-\alpha x} \quad (8)$$

where α is a constant defined by $(2\upsilon\omega)^{1/2}/cr$.

An equivalent result is demonstrated by Lamb by solving the wave equation for the same boundary conditions.

Figure 2:
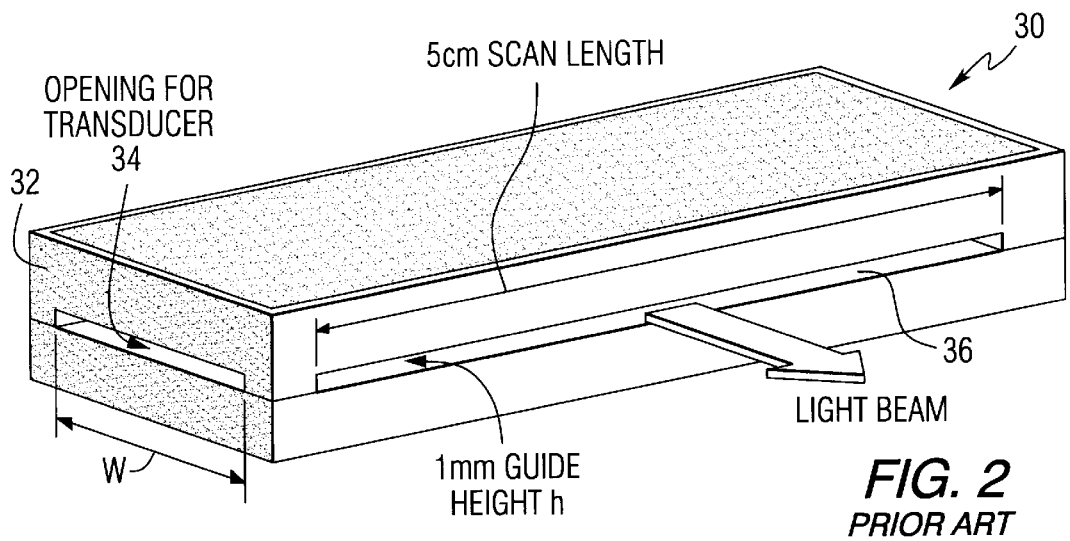
FIG. 2 diagrammatically illustrates a conventional acoustic traveling wave lens waveguide of a fixed narrow rectangular channel cross-section of width W and constant height h.

FIG. 2 diagrammatically illustrates an acoustic traveling wave lens (ATWL) waveguide 30 having a narrow rectangular channel cross-section of width W and height h (h<<W). As a non-limiting example, waveguide 30 has a scan length of 50 cm. Inspection of equation (7) shows that such a waveguide of constant cross-section will have exponential attenuation of acoustic intensity as given by the above equation (8), where r is replaced by $2A_c/L$. For the narrow rectangular waveguide configuration of FIG. 2, having a height h, the area to perimeter ratio is 2/h. Therefore, the attenuation in such a narrow rectangular guide is given by equation (8), where α is $(2\upsilon\omega)^{1/2}/ch$.

Figure 3:
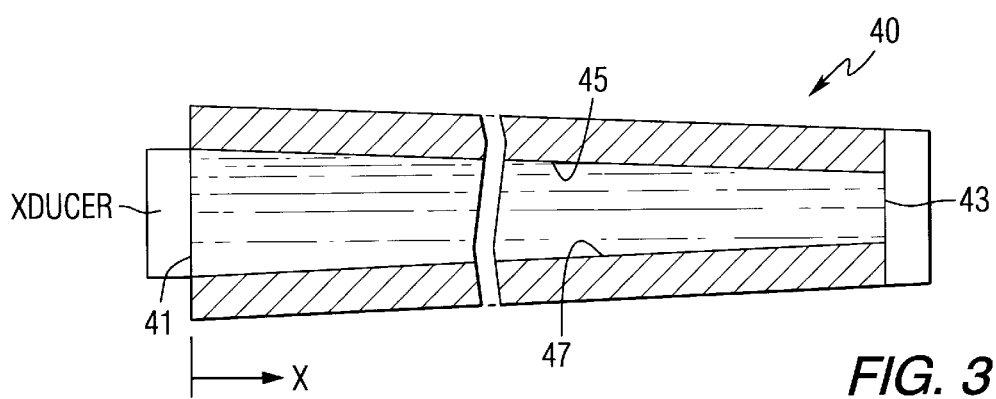
FIG. 3 diagrammatically illustrates an acoustic traveling wave lens waveguide having a varying narrow rectangular channel cross-section of width W and tapering height h, in accordance with the present invention.

As described briefly above, and as diagrammatically illustrated in FIG. 3, pursuant to the present invention, the channel profile along the acoustic wave traveling path (i.e., in the direction x of scan of the optical beam), through the scanning device (acoustic traveling lens waveguide 40) is tapered from the transducer end 41 toward the far end 43 of the waveguide, so as to maintain constant acoustic power intensity along the entire length of the guide. For a narrow rectangular guide of the type diagrammatically illustrated in FIG. 3, having a tapering height h defined by the linear variation in separation between channel height boundaries 45 and 47, equation (6) becomes Equation (9) as:

$$\frac{d(I*h)}{dx} = \frac{2}{c}\sqrt{\frac{v\omega}{2}}\, I \quad (9)$$

In order to maintain the average acoustic power per cross-sectional area (or acoustic intensity I) constant along the length x of the channel, equation (9) may be reduced to a function of only h as:

$$\frac{dh}{dx} = \frac{\sqrt{2v\omega}}{c} \quad (10)$$

This solution has the form:

$$h = h_0 - \frac{\sqrt{2v\omega}}{c}x = h_0(1 - \alpha_0 x) \quad (11)$$

Equation (11) represents the variation of acoustic power intensity along the length x of a guide having a height or boundary separation, which decreases linearly in the direction (x) of propagation of the acoustic wave. The slope of the taper is equal to $\alpha_0$, which is the same as the attenuation factor for a narrow rectangular guide of constant height $h_0$.

For the case of a narrow rectangular guide having a linear taper k, both I and h are functions of distance x, yielding the following equation (12):

$$\frac{d(I*h)}{dx} = I\frac{d(h_0(1-kx))}{dx} = h_0(1-kx)\frac{dI}{dx} = -h_0 kI + h_0(1-kx)\frac{dI}{dx} \quad (12)$$

Substituting this expression into equation (9) yields the following first order differential equation (13):

$$\frac{dI}{dx} = (k - \alpha_0) * \left(\frac{I}{1 - kx}\right) \quad (13)$$

The general solution to equation (13) is:

$$I = I_0 \left(\frac{1}{1-kx}\right)^{(1-\alpha_0/k)} \quad (14)$$

For k=α, equation (14) reduces to I=$I_0$, Thus, for the case of k<<$\alpha_0$, the attenuation becomes negligible compared to the concentrating effect of the channel taper and I≅$I_0$/(1−kx). In the limit as k approaches zero, equation (14) reduces to I=$I_0 e^{-a0x}$, as in the case of the rectangular guide of constant cross-section.

EXAMPLE

50 CM ATWL SCANNER OPERATING AT 500 kHz

A guided liquid ATWL employing water as the acoustic medium was tested at an acoustic frequency 500 kHz (yielding an acoustic wavelength in water of 3 mm). This provided an effective quarter wavelength ATWL aperture of 0.75 mm, corresponding to a desired laser beam FWHM diameter. The guide thickness was less than a half wavelength, in order to prevent possible multi-mode excitation of acoustic waves, and greater than a quarter wavelength, to provide clearance for the incident light beam in the vertical dimension (height h) of the guide. This resulted in a desired range of guide height between 0.75 and 1.5 mm.

A 1 mm 'fixed height' waveguide was initially selected for the test scanner. The measured acoustic attenuation in the fixed height test scanner was measured at approximately 4 dB over the 50 cm scan length of the constant or fixed height guide. The theoretical attenuation coefficient $\alpha_0$ for a 1 mm guide is $(2v\omega)^{1/2}$/ch or 0.0167 cm$^{-1}$m, where $v=10^{-6}$m$^2$/s, $\omega=2\Pi \cdot 5 \times 10^5$/s, c=1500 m/s, and h=1 mm.

Applying a taper to this guide geometry in accordance with the invention, using a slope equal to $\alpha_0$, yielded a height of 1-(0.0167)(50) or 0.16 mm at the end of the 50 cm guide. As a result, in order to stay within the desired height range, an initial 1 mm waveguide was considered to be too small for a practical implementation of a tapered configuration. Increasing the initial guide height to 1.4 mm yields $\alpha^0$=0.0119 cm$^{-1}$, and a (relatively practical) height of 0.80 mm at a distance of 50 cm from the acoustic transducer. It may also be noted that reducing the acoustic frequency will allow longer scanner lengths, since lowering acoustic frequency decreases the attenuation factor, and also allows for larger guide heights due to the longer acoustic wavelength.

For the foregoing description, it will be readily appreciated that tapering the thickness of the channel along its length, as described above with reference to equation (14), for k<<$\alpha_0$, effectively makes the attenuation along the traveling wave lens channel negligible, compared to the concentrating effect of the channel taper and I≅$I_0$/(1−kx).

Figure 4:
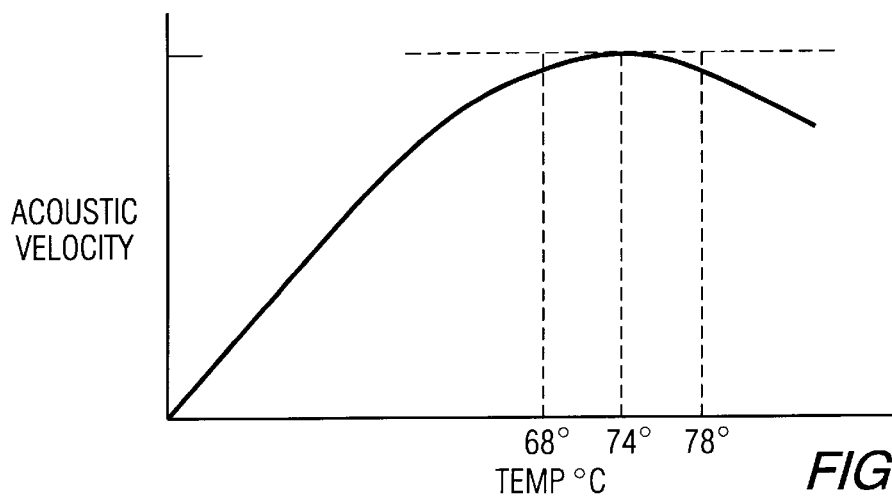
FIG. 4 shows the non-linear acoustic velocity versus temperature characteristic of water.

In addition to tapering the waveguide as described above, to minimize the effect of temperature non-uniformity through the water medium, the waveguide may be heated, to maintain the temperature of the liquid medium (water) within the waveguide channel within a prescribed temperature range over which the acoustic velocity remains substantially constant or undergoes a relatively small variation More particularly, as shown in the non-linear acoustic velocity versus temperature characteristic of FIG. 4, the acoustic velocity of water increases up to a temperature on the order of 73–74° C., at which the slope is minimal (zero), and then decreases. Maintaining the operating temperature of the water channel in a range of from 68° C. to 78° C., and preferably at 73–740° C., serves to minimize acoustic velocity variation in the channel.

While we have shown and described an embodiment in accordance with the present invention, it is to be understood that the same is not limited thereto but is susceptible to numerous changes and modifications as are known to a person skilled in the art, and we therefore do not wish to be limited to the details shown and described herein, but intend to cover all such changes and modifications as are obvious to one of ordinary skill in the art.

What is claimed:

1. An acoustic traveling wave lens structure for an acousto-optic scanner comprising a fluid-containing channel, upon which a scanned optical beam to be modulated by said acoustic traveling wave lens is incident, and which is bounded by spaced-apart walls that extend between a first end of said channel, to which an acoustic transducer is coupled, and a second end of said channel that terminates an acoustic traveling wave launched into said fluid-containing channel from said acoustic transducer, and wherein said channel is tapered from said first end to said second end thereof in a manner that maintains a constant acoustic power density of said acoustic wave traveling therealong.

2. An acoustic traveling wave lens structure according to claim 1, wherein said channel is linearly tapered from said first end to said second end thereof.

3. An acoustic traveling wave lens structure according to claim 1, wherein said spaced-apart walls of said channel include first and second generally parallel spaced apart walls through which said scanned optical beam passes, and third and fourth generally spaced apart walls that intersect said first and second spaced apart walls and define therewith said channel, and wherein separation between said third and fourth spaced apart walls decreases from said first end of said channel to said second end of said channel so as to maintain a constant acoustic power density of said acoustic wave traveling therealong.

4. An acoustic traveling wave lens structure according to claim 1, wherein said fluid comprises a liquid medium.

5. An acoustic traveling wave lens structure according to claim 4, wherein said liquid medium is water.

6. An acoustic traveling wave lens structure according to claim 2, wherein said separation between said third and fourth spaced-apart walls is less than one-half a wavelength, but greater than one-quarter wavelength of said acoustic traveling wave.

7. An acoustic traveling wave lens structure according to claim 1, wherein said fluid-containing channel is maintained within a temperature range that minimizes variation in acoustic velocity with temperature.

8. An acoustic traveling wave lens structure according to claim 7, wherein said fluid is water, the temperature of which is maintained within a range of from 68° C. to 78° C.

9. For use with an acousto-optic scanner having a fluid-containing channel, upon which a scanned optical beam to be modulated by an acoustic traveling wave is directed, said channel being confined between boundaries extending between a first end of said channel to which an acoustic transducer is coupled, and a second end of said channel that terminates said acoustic traveling wave launched into said fluid-containing channel from said acoustic transducer, a method of preventing a variation in acoustic power density of said acoustic wave comprising the steps of:

(a) providing a separation between said boundaries of said channel that is less than one-half a wavelength but greater than one-quarter wavelength of said acoustic traveling wave; and (b) tapering said separation between said boundaries of said channel provided in step (a).

10. A method according to claim 9, wherein step (b) comprises linearly tapering said separation between said boundaries of said channel provided in step (a).

11. A method according to claim 9, wherein said boundaries of said channel include first and second generally parallel spaced apart walls through which said scanned optical beam passes, and third and fourth generally spaced apart walls that intersect said first and second spaced apart walls and define therewith said channel, and wherein step (b) comprises tapering said separation between said thiud and fourth spaced apart walls in a manner that maintains a constant acoustic power density of said acoustic wave traveling therealong.

12. A method according to claim 9, wherein said fluid is a liquid medium.

13. A method according to claim 9, wherein said liquid medium is water.

14. A method according to claim 9, wherein said liquid medium is maintained within a temperature range that minimizes variation in acoustic velocity with temperature.

15. A method according to claim 9, wherein said liquid medium is water, the temperature of which is maintained within a range of from 68° C. to 78° C.

16. A method of operating an acousto-optic scanner having a fluid-containing channel comprising the steps of:

(a) maintaining the temperature of the fluid the channel within a prescribed temperature range over which the acoustic velocity remains substantially constant or undergoes a relatively small variation; and (b) launching an acoustic wave into said fluid-containing channel the temperature of which is maintained in accordance with step (a), so as to modulate a beam of light incident thereon.

17. A method according to claim 16, wherein said fluid comprises a liquid medium that is maintained within a temperature range that minimizes variation in acoustic velocity therein.

18. A method according to claim 16, wherein said fluid comprises a liquid medium that is maintained within a temperature range that minimizes variation in acoustic velocity therein.

19. A method according to claim 9, wherein said liquid medium is water, the temperature of which is maintained within a range of from 68° C. to 78° C.

* * * * *